United States Patent [19]
Morris et al.

[11] 3,752,181
[45] Aug. 14, 1973

[54] HIGH PRESSURE BUTTERFLY VALVE

[76] Inventors: William A. Morris, 2 Gessner Rd., Houston, Tex. 77024; Samuel S. Clark, P.O. Box 795, Cleveland, Tex. 77327

[22] Filed: Oct. 20, 1971

[21] Appl. No.: 190,751

[52] U.S. Cl. .................. 137/375, 251/152, 251/175, 251/307, 251/308
[51] Int. Cl. ............................................. F16k 1/22
[58] Field of Search ...................... 137/375; 251/148, 251/152, 175, 306, 307, 308

[56] References Cited
UNITED STATES PATENTS

| | | | |
|---|---|---|---|
| 3,290,001 | 12/1966 | Taylor | 251/306 X |
| 3,556,476 | 1/1971 | Haenky | 251/171 X |
| 2,929,406 | 3/1960 | Anderson | 251/172 X |
| 3,192,945 | 7/1965 | Blakeley | 137/375 |
| 2,722,397 | 11/1955 | Bruce | 251/174 X |
| 3,473,784 | 10/1969 | Radford | 251/148 X |
| 2,229,931 | 1/1941 | Parker | 251/175 X |
| 3,376,014 | 4/1968 | Buckley | 251/306 |
| 3,399,863 | 9/1968 | Fawkes | 251/308 X |

Primary Examiner—Harold W. Weakley
Attorney—Tom Arnold, James L. Jackson et al.

[57] ABSTRACT

A high pressure butterfly valve having a pressure actuatable valve element that is flexed by fluid pressure to enhance the sealing ability of the valve in direct proportion to the pressure of the fluid controlled by the valve. The butterfly valve of this invention incorporates an annular seat element retained within the valve body by an upper valve actuating stem and a lower trunnion. A concavo-convex butterfly valve element is rotatably carried by the trunnion and valve actuating stem with the convex surface thereof facing upstream in the closed position. The valve element is capable of flexing responsive to application of fluid pressure in this manner as to expand the peripheral sealing surfaces thereof and enhance the mechanical sealing pressure as fluid pressure increases. The butterfly element also floats relative to the trunnion and valve stem thereby allowing the valve element to float or self-align itself to obtain optimum sealing engagement as pressure is applied by the fluid controlled by the valve.

11 Claims, 5 Drawing Figures

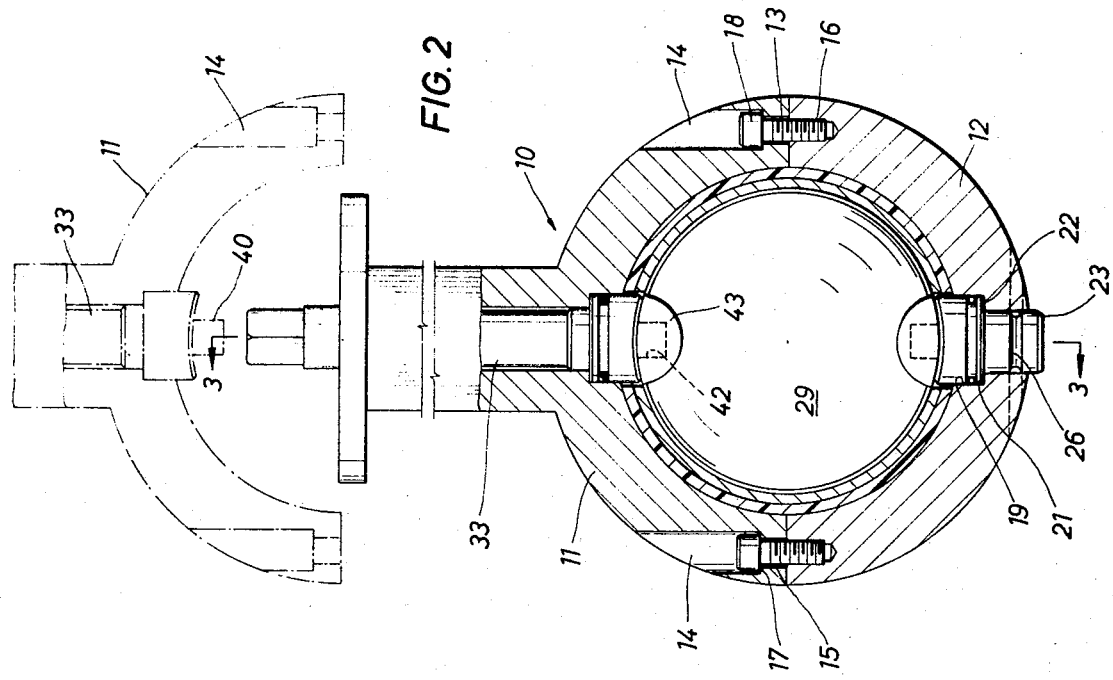
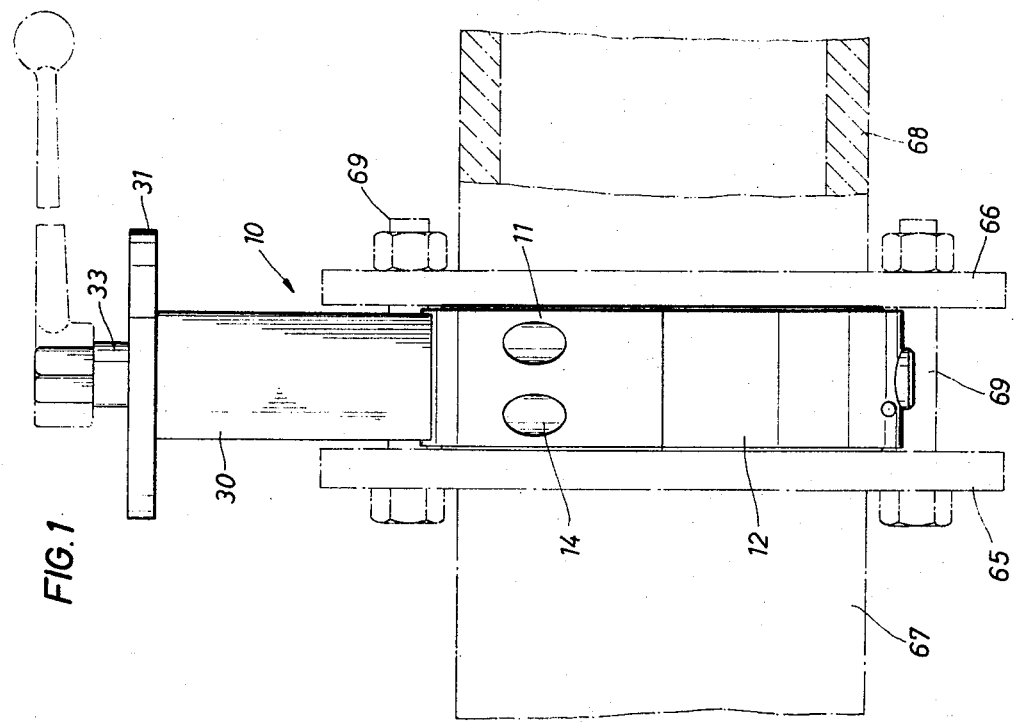

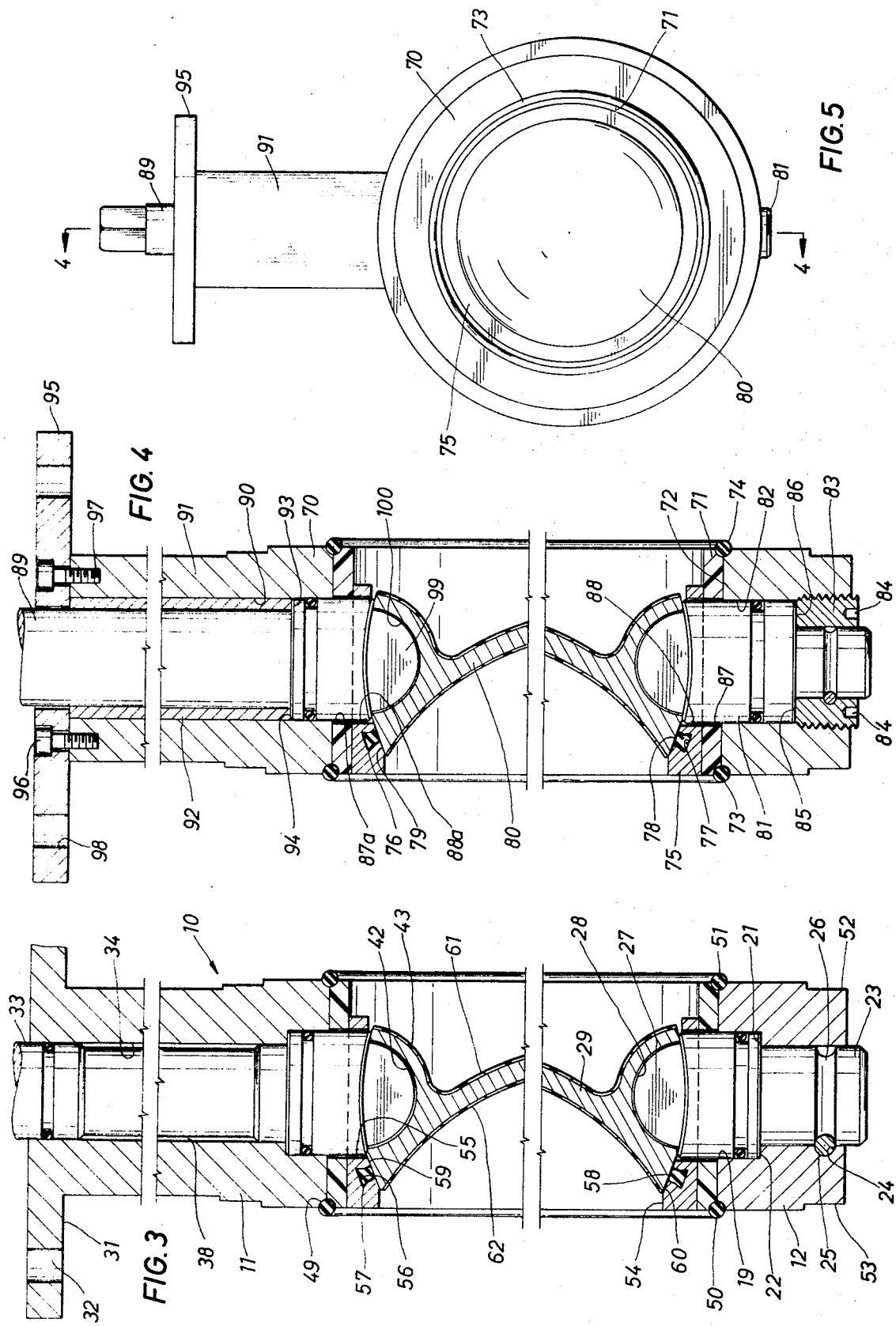

HIGH PRESSURE BUTTERFLY VALVE

FIELD OF THE INVENTION

This invention relates generally to butterfly valves and more particularly to a butterfly valve structure designed for high pressure service that utilizes the forces of the fluid controlled by the valve to enhance the sealing ability thereof.

BACKGROUND OF THE INVENTION

Butterfly valves are typically simple and reliable valve structures that are particularly designed for operation in a low pressure service condition. Sealing of a butterfly valve is generally accomplished by an interference fit between a rotatable plate like valve element and a stationary valve seat that generally is composed of an elastomeric substance that will yield to define an interference fit with the rotatable valve. Because the seal is of interference nature and because the elastomeric seat material will yield quite readily to excessive pressures, it is considered difficult to provide a butterfly valve construction that will withstand pressures greatly in excess of 150–200 psi. As fluid pressures increase, therefore, it is generally deemed necessary to provide a valve of different operating capability and capable of withstanding higher pressures.

Another disadvantage of butterfly valves typically available is the restriction created by the valve element in the cross-sectional area of the flow passages of the valves. Since the butterfly element of a butterfly valve is frequently disc-like and tapers from a fairly thick center to relatively thin edges, the butterfly element will typically be of substantial cross-sectional area and will adversely affect the flow of fluid through the valve. The cross-sectional area of the flow passages of a butterfly valve therefore frequently must be quite large in order to provide sufficient cross-sectional area for purposes of fluid flow and the size of the resulting valve is consequently quite large.

The butterfly valve is typically a valve of relatively thin silhouette and is generally quite structurally stable. Butterfly valve structures are frequently designed to be received between the flanges of ordinary pipe thereby providing a valve structure that is generally of lower cost as compared to other types of valves.

The load applied to a closed butterfly valve element by pressurized fluid is typically transmitted directly to the trunnions of the valve, thereby causing the trunnions to be highly stressed when the fluid is maintained under relatively high pressure. When valves are used to control fluids containing a high concentration of hydrogen sulfide, the trunnions, being highly stressed, will be subjected to conditions which make the trunnions susceptible to stress corrosion, frequently referred to as hydrogen embrittlement. It would therefore be desirable to restrict the magnitude of forces applied to the trunnion and drive stem portions of the valve construction especially when the valve is to be employed to control the flow of fluids of high hydrogen sulfide content.

Butterfly valves generally must be completely removed from the line for repair. When repairs become necessary, it is typically more appropriate to replace the butterfly valve with another valve rather than subjecting the flow system to enough delay necessary for disassembly and repair of a valve after the same has been removed from the line. Since valves frequently require repairs of minor nature to render them serviceable, it is generally impracticable and excessively expensive to provide a replacement valve when minor repairs are necessary.

Butterfly valves are not generally satisfactory for vacuum service especially where substantial negative pressures are involved. The elastomeric material ordinarily engaged by a butterfly valve element will yield responsive to subatmospheric fluid pressure in the same manner as if employed in conventional pressure service conditions.

A limited number of high pressure butterfly valve assemblies have been developed, but, for the most part, such valve constructions are extremely delicate and expensive because of the manufacturing tolerances necessary to provide optimum sealing capability. Such high pressure butterfly valves also generally require a high degree of maintenance in order to maintain optimum sealing capability.

It is therefore a primary object of this invention to provide a novel high pressure butterfly valve construction that incorporates a valve element that will float into proper sealing engagement thereby achieving self-alignment.

It is an even further object of the present invention to provide a novel high pressure butterfly valve construction that may employ a blow-out proof actuating stem and trunnion mechanism that will not become separated from the valve body in the event successive pressures are encountered.

Among the several objects of the present invention is noted the contemplation of a novel high pressure butterfly valve construction that is particularly designed to prevent the forces developed by line pressure from being solely supported by the stem and trunnion mechanisms, thereby substantially eliminating the problem of stress corrosion of the stem and trunnion elements that might otherwise result.

It is also an object of the present invention to provide a novel high pressure butterfly valve construction utilizing replaceable seat assemblies that facilitate simple and quick repair in the event such is necessary.

Another object of the present invention contemplates the provision of a novel high pressure butterfly valve construction that may be disassembled and repaired without necessitating complete removal of the valve structure from the line.

It is another feature of the present invention to provide a novel high pressure butterfly valve construction that is adapted to be lined with any suitable lining material, thereby adapting the butterfly valve construction for virtually any service condition.

Still another feature of the present invention includes the provision of a novel high pressure butterfly valve construction providing a flow passage cross-section of optimum size relative to the overall size of the valve structure.

My invention also contemplates the provision of a novel high pressure butterfly valve construction that is simple in nature, reliable in use and low in manufacturing costs.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may comprise a valve body having a relatively thin silhouette and may include either an integral one-piece body or a split body that may be disassembled by removing body bolts. The body may be provided with aligned opposed bores, one of which receives a trunnion for rotatably supporting a butterfly valve element and the other bore to receive a valve actuating stem capable of being mechanically interconnected with the valve element and being operative to impart driving rotation to the valve element for purposes of opening and closing the valve. The inner extremity of the trunnion may be of generally spherical configuration to adapt the same for bearing engagement with a socket formed in the valve element and being of generally spherical complimentary configuration. The ball and socket configuration of the mechanical connection between the trunnion and the valve element provides a universal journal to allow self-alignment of a valve element. Such self-alignment is also enhanced by an arcuate valve drive projection that is received within an arcuate socket defined in the valve element to provide nonrotatable driving connection between the actuating stem and the valve element. The arcuate drive connection is also designed to allow limited movement of the valve element downstream in the closed position thereof, thereby allowing the valve element to be self-aligning with respect to a valve seat assembly, removably secured by the trunnion and actuating stem within the valve body.

The valve seat assembly presents a partially spherical surface of complimentary configuration with respect to the configuration of an annular sealing surface defined by the periphery of the butterfly valve element. The seat assembly carries a resilient sealing element, such as an O-ring, contained within an annular groove to establish optimum sealing engagement with the peripheral sealing surface of the butterfly valve element.

The butterfly valve element may be concavo-convex configuration and may be relatively flexible with the convex surface thereof facing upstream in the closed position of the valve. As fluid pressure is applied against the covex surface of the valve element, the valve element will flex causing the annular sealing surface thereof to be urged radially outwardly thereby enhancing the forces of mechanical engagement between the sealing surface of the valve element and the working surface defined by the valve seat assembly. Mechanical forces applied by the pressurized fluid is transmitted directly to the valve seat assembly and is absorbed only to a limited degree by the trunnion and actuating stem mechanisms of the valve.

BRIEF DESCRIPTION OF THE DRAWINGS

So that the manner in which the above recited features, advantages and objects of the present invention, as well as others which will become apparent, are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

In the drawings:

FIG. 1 is an elevational view of a high pressure butterfly valve constructed in accordance with the present invention.

FIG. 2 is a partial sectional view of the high pressure butterfly valve of FIG. 1 in full line and showing the upper body section of the valve being disassembled from the lower body section thereof in broken line.

FIG. 3 is a sectional view taken along line 3—3 in FIG. 2 and illustrating the valve stem portion, the lower trunnion portion and the seat portion of the valve structure in detail.

FIG. 4 is a sectional view of a high pressure butterfly valve representing a modified embodiment of the present invention.

FIG. 5 is an elevational view illustrating the valve structure of FIG. 1 as disassembled from the flanges of a conduit.

DETAILED DESCRIPTION OF PREFERRED EMBODIMENTS

Now referring to the drawings and first to FIG. 1, there is shown a high pressure butterfly valve, generally designated at 10, having an upper generally semicircular body section 11 and a lower generally semicircular body section 12 that may be secured together to form a unitary body assembly. Connection between the upper and lower body sections may be established by bolts 13 that are disposed within bolt passages 14, formed in the upper body section, and extend through reduced diameter apertures 15 into threaded engagement with threaded bores 16, formed in the lower body section. Passages 14 and 15 in the upper body section may be concentric and may define annular shoulders 17 providing support for the head portions 18 of the bolts 13. The split body arrangement illustrated in FIGS. 1 and 2 effectively adapts the valve construction for disassembly and repair without removing the valve from the line.

The lower body section 12 is provided with a trunnion bore 19 having a reduced diameter portion 20 that cooperates to define an annular upward facing shoulder 21 providing support for a downwardly facing shoulder 22 of a trunnion element 23 disposed within the trunnion passage. A transverse bore 24 is defined within the lower body section in which is received a generally cylindrical locking pin 25 that is also partially received within an annular groove 26 formed in trunnion element 23. After the trunnion element 23 has been properly positioned within the trunnion passage 19 the locking pin 25 is inserted into the bore 24 and is received within the groove 26 to lock the trunnion element within the lower body section 12.

The upper extremity of the trunnion element 23 is provided with a generally spherical bearing surface 27 adapted to be received within the bearing socket 28 of a rotatable butterfly type valve element 29. The fit between the spherical bearing surface 27 and the bearing socket 28 will be such that controlled floating of the valve element 29 is allowed to allow the valve element to seek proper seating engagement in the closed position thereof, as described in detail hereinbelow.

The upper body section 11 may include an integral actuating stem neck 30 having a valve actuator flange 31 at the upper extremity thereof and being provided with bolt apertures 32 through which bolts or the like extend to connect a valve actuating device of any appropriate type to the butterfly valve assembly. Any appropriate valve actuating mechanism may be connected to the flange 31 to achieve rotation of a valve actuating stem 33 without departing from the spirit or scope of the present invention. The upper body section 11 is provided with an actuating stem passage 34 extending through the upper body section and the actuating stem neck 30. The actuating stem passage is provided with enlarged portion 35 at the lower extremity thereof which cooperates with the upper portion of the stem passage to define a downwardly facing annular shoulder 36 providing support for an upwardly facing shoulder 37 defined on the lower portion of the actuating stem 33.

For the purpose of reducing friction between the rotatable valve stem and the valve body, the stem may be relieved intermediate its extremities to provide annular clearance such as shown at 38.

The actuating stem 33, like the trunnion element 23, is "blowout-proof" because it is inserted into the stem passage 34 from the interior of the upper body section 11 and includes an enlarged head portion 39 defining the annular shoulder 37. After the valve structure has been assembled and placed in service, it is impossible for either the valve stem or the trunnion to be blown from the valve body structure without shearing either the body structure or the supporting shoulders of the stem and trunnion.

The valve stem 33 may be provided with a drive key portion 40 that is received within a key slot 42 defined in a support boss 43 of the butterfly valve element 29. The drive key 40 and the drive key slot 42 are of mating arcuate configuration, as illustrated in FIG. 1, to allow predetermined movement of the valve element 29 in the closed position thereof, thereby allowing the valve element to seek proper seating relation with the valve seat of the valve.

In the event the valve is to be subjected to a fluid that might have corrosive or abrasive properties, thereby tending to erode or corrode the valve structure, it may be appropriate to provide a lining for the valve, which lining, according to this invention, may conveniently take the configuration illustrated in FIG. 1 which shows a lining 45 that may be composed of any suitable material to protect the valve structure against erosion or corrosion. The lining may be provided with upper and lower apertures 46 and 47 through which may extend the enlarged portions of the valve stem and trunnion, respectively, to lock the lining against movement relative to the valve body structure. To provide a positive seal between the lining and the valve body structure, annular groove segments 48 and 49 may be formed, respectively, in the lining and valve body structure which segments cooperate to define a groove of generally semicircular cross-section. Annular sealing members, which may be in the form of O-rings 50 and 51, may be retained within the annular grooves with a portion thereof protruding beyond the upstream and downstream faces 52 and 53 of the valve body structure for sealing engagement with the flanges of conventional conduit, as described hereinbelow.

The valve structure may incorporate an annular seat assembly 54 that may be received in close fitting relation within the lining 45. Within the seat assembly 54 may be formed locking apertures 55 and 56 through which the enlarged portions of the trunnion 23 and valve stem 33 extend to establish an interlocking relationship between the valve body and the seat assembly, thereby preventing movement of the seat assembly relative to the valve body structure. The seat assembly may also include an annular groove 56 having a resilient sealing element 57 disposed therein for sealing engagement with the butterfly valve element 29. If desirable, the annular groove 56 may be of generally triangular cross-section with an enlarged base portion and presenting a restricted opening through which a portion of the resilient element 57 may extend for sealing engagement with the butterfly valve element. The generally triangular cross-sectional configuration of the annular groove 56 cooperates with the annular sealing element, which may be molded within the groove, if desired, to provide a configuration having structural stability to prevent the sealing element from being extruded from the groove upon opening or closing movements of the valve element.

The seat assembly 54 may be provided with a partially spherical internal surface 59 that is disposed in close proximity to a sealing surface 60 defined at the outer edge of the butterfly valve element, regardless of the relative position of the valve element during rotation.

Positive sealing between the sealing surface safety of the valve element and the resilient sealing element 57 may be established by ability of the valve element to float downstream and seek proper sealing relationship with the valve seat structure 54 and with the resilient sealing element 57. Sealing ability of the valve is also enhanced by the ability of the butterfly valve element 29 to expand radially in response to the application of fluid pressure from the upstream side thereof.

With regard to controlled floating of the valve element downstream into proper sealing relationship with the seat assembly 54, the spherical bearing surface 27 and the bearing socket 28 are so dimensioned that a controlled amount of clearance exists, thereby allowing controlled universal shifting of the valve element to compensate for any misalignment of the valve element due to manufacturing tolerances and to allow the valve element to seek fluid tight sealing engagement with the sealing element 57. For example, in the manufacture of a 4 inch valve it has been determined that a clearance of 0.031 inches between the spherical bearing surface of the trunnion 32 and the spherical bearing socket 28 will permit the valve element to float universally into proper sealing engagement with the seat assembly.

Likewise, the arcuate key drive portion 40 of the valve stem 33 and the arcuate surface of the stem slot 42 are provided with similar controlled spacing thereby allowing a floating action to also occur at the connection between the valve stem and the rotatable butterfly disc. The planar surfaces of the drive key portion 40 of the valve stem and the planar surfaces of the key slot 42 have a relatively close fit to allow proper bearing engagement between the surfaces of a key and key slot to prevent excessive Brinnelling which might otherwise occur.

As is apparent from the drawings, the rotatable butterfly valve element 29 is of relatively thin concavo-convex configuration with a convex surface 61 thereof disposed to face in the upstream direction with the valve element in its closed position while a concave surface 62 will face in the downstream direction. The surfaces 61 and 62 are substantially concentric as shown in the drawings to allow controlled flexing of the valve element. It is not intended, however, that the valve element be limited to concentric concave and convex surfaces, it being obvious that surfaces of other than concentric configuration may be employed depending upon the degree of flexibility that is desired and the pressure range for which the valve element is designed. For example, the concave and convex surfaces may be generated from different centers if it is desirable that the central portion of the butterfly valve element 29 be of greater thickness than the edge portions thereof. Also, it should be borne in mind that is not necessary that either of the concave or convex surfaces be partially spherical, it be obvious that curved surfaces of other than partially spherical configuration might serve as well for the purposes intended.

If desired, the butterfly valve element 29 may be provided with both upstream and downstream linings 63 and 64 to protect the metal structure of the valve element from corrosion or erosion by the fluid being controlled by the valve.

With the valve element 29 in the closed position thereof, fluid pressure applied on the upstream side of the valve element, will act upon the relatively thin concavo-convex portion thereof which tends to flatten the valve disc, thereby expanding the disc radially and urging the sealing surface 60 toward the seat assembly 54 thereby enhancing the sealing ability between the sealing surface 60 and the protruding portion of the resilient sealing element 57. It is apparent, therefore, that the sealing ability of the butterfly valve element is enhanced in direct proportion to the forces developed by pressurized fluid acting upon the upstream side thereof.

The valve construction illustrated, particularly in FIGS. 1 and 2, may be assembled by placing the lining 45 and the annular seat assembly 54 in proper position relative to the lower body section 12. The trunnion element 23 then may be inserted through the locking apertures 55 and 47 of the seat assembly and lining, respectively. After tunnion element 23 has been positioned with the annular shoulder 22 thereof in engagement with the sport shoulder 21, locking groove 26 will be disposed in alignment with locking pin bore 24. The locking pin 25 then may be inserted in the bore 24 thereby positioning an exposed part of a locking pin within the annular groove 26 and blocking the trunnion 23. The rotatable valve element 29 then may be installed with the spherical bearing surface 27 being received within the bearing socket 28.

The upper body section 11, with the valve stem 33 disposed therein, with shoulder 37 abutting the support shoulder 36, may be lowered into assembly with the lower body section 12 and may be secured in such assembly by both members 13. Upon assembly of the upper body section 12 to the lower body section, the drive key portion 40 of the valve stem 33 will enter the drive key slot 42 of the rotatable valve element 29. Simultaneously, the enlarged lower portion of the actuating stem 33 will be extended through apertures 46 and 56 in the lining and seat assembly, respectively, thereby locking the upper portions of the lining and seat assembly in fixed relation with respect to the upper body section 11. O-ring sealing elements 50 and 51 then may be disposed within the grooves provided therefor and conventional flanges 65 and 66 of pipes 67 and 78, respectively, may be drawn by bolts or threaded studs 69 into sealed assembly with the assembled upper and lower body sections.

To facilitate operation of the valve any suitable quarter turn valve actuating mechanism may be secured to the actuator flange 31 in driving relation with the actuating stem 33.

With reference now to FIGS. 4 and 5, there is illustrated a modified embodiment of the present invention wherein an integral valve body 70 is employed rather than the split valve body illustrated in FIGS. 1 and 2. A lining 71, to protect against corrosion or erosion, may be disposed within the valve body 70 in close fitting relation with a generally cylindrical internal surface 72 defined by the valve body. Annular sealing elements 73 and 74 may be received within annular grooves defined by cooperating groove segments formed in the lining and valve body in the manner discussed above in regard to FIG. 3.

An annular seat assembly 75, constructed generally identical to the seat assembly structure 54 set forth in FIG. 3, may be disposed within the valve body with the outer periphery thereof disposed in intimate engagement with the inner periphery of the lining 71. The seat assembly 75 may include a sealing element 76 received within an annular groove 77 and may also include a protruding sealing portion 78 establishing sealing engagement with an annular sealing surface 79 formed on a rotatable concavo-convex butterfly valve element 80 that is of generally identical configuration, as compared with the butterfly valve element 29 set forth in FIGS. 1, 2 and 3.

A trunnion element 81, that may be identical with the trunnion structure set forth in FIG. 3, may extend through a trunnion bore 82, formed in the lower portion of the valve body 70, and may be retained in assembly with the valve body by a retainer element 83 that may be threadedly received by internal threads formed at the outer extremity of the trunnion bore 82. Spanner wrench apertures 84 may be formed in the retainer 83 to facilitate insertion and removal of the retainer as desired. The retainer may present an annular support surface 85 that may be disposed in intimate engagement with a support shoulder 86, thereby retaining the trunnion 81 in assembly with the valve body. The enlarged upper portion of the trunnion element 81 extends through locking apertures 87 and 88, formed, respectively, in the lining 71 and seat assembly 75 and thereby locking the lining and seat assembly with respect to the body 70.

A valve actuating stem 89, constructed essentially identical with respect to the valve actuating stem 33 of FIG. 1 and 2, may be received within a generally cylindrical actuating stem bore 90 defined in the valve body 70 and extending through an actuating stem neck portion 91 of the valve body. A stem retainer member 92 may be disposed within the cylindrical bore 90 presenting a support surface 93 disposed for engagement by an annular shoulder 94 defined by the lower enlarged portion of the valve actuating stem 89. The retainer 92 may be supported by an actuator adapter plate 95 secured to the actuating stem neck by bolts 96 that may be threadedly received with internally threaded bores 97 defined in the neck portion of the valve body. A quarter turn valve actuating mechanism of any suitable type may be secured to the adapter plate 95 by bolts extending through apertures 98 or by any other suitable means of connection. Although the actuator adapter plate 95 is shown as restraining the retainer sleeve 92, it should be borne in mind that any suitable means for securing the retainer sleeve in assembly within the neck portion of the valve body may be employed within the spirit and scope of the present invention.

Valve actuating stem 89 may be provided with a drive key portion 99 at its lower extremity that interfits with a key slot 100 formed in the upper extremity of a butterfly valve disc 80. The structural and operational relationships between the butterfly valve disc, the trunnion element 81 and the valve actuating stem 89 are essentially identical with respect to the structures illustrated in FIGS. 1 and 2.

The valve body 70 is adapted to be disposed between conventional flanges of pipe that are drawn into intimate sealed assembly with the valve body by bolts in the manner illustrated in FIG. 1. It will generally be necessary to completely remove the valve body from the line in order to accomplish repair operations.

The valve, illustrated in FIGS. 4 and 5, is assembled by inserting the annular lining 71 and the seat assembly 75 into the valve body 70 with locking apertures 87 and 88 thereof in alignment with the valve body bores. The butterfly valve element 80 then may be positioned with the bearing socket 28 and stem drive slot 42 in proper alignment with respect to the aligned trunnion and stem passages 82 and 90, respectively. Trunnion 81 then may be inserted into the bore 82 and through locking apertures 87 and 88 to a position where the spherical bearing surface thereof is received within a bearing socket of the valve element. The valve stem 89 then may be inserted into bore 90 with the enlarged portion thereof extending through locking apertures 87a and 87b in the lining and seat assembly, respectively, to lock the upper portions of the lining and seat assembly with respect to the valve body. In this position the drive key portion 99 of valve actuating stem 89 will be disposed within the drive key slot 100, supporting the upper extremity of the rotatable valve element 80 within the valve body.

The trunnion retainer element 83 and the valve stem retainer sleeve 92 may be installed thereby locking the trunnion and valve stem against separation from the valve body. The assembled valve body then may be placed between the flanges of standard pipe and the flanges may be drawn together by bolts to secure the valve body in sealed assembly with the flanges.

When the rotatable valve element is disposed in its open position, the relatively thin configuration of the valve presents minimum obstruction to the flow of fluid through the valve structure. In fact, the concavo-convex configuration of the butterfly valve element functions to prevent the development of eddy currents within the fluid flowing through the valve and, therefore, allows the valve structure to have optimum fluid flow characteristics.

Upon rotation of the valve element to its closed position the fluid acting upon the upstream side thereof will force the valve element slightly downstream thereby allowing the valve element to float into proper seating relation with the annular seat assembly and establish a fluid tight seal. As fluid pressure increases, the valve element being a relatively thin structure and composed of flexible material, will tend to flatten from its concavo-convex configuration thereby causing the annular sealing surface thereof to expand radially thereby increasing the forces of its engagement with the seat assembly. It is apparent therefore that the sealing ability of the valve is enhanced directly proportional to the pressure of the fluid controlled by the valve.

In view of the foregoing, it is apparent that we have provided a novel high pressure butterfly valve construction that incorporates a rotatable butterfly valve element having limited universal movement in order to compensate for minor misalignment due to tolerances and which will self-align or float into proper sealing engagement with the seat assembly of the valve.

The valve structure of our invention provides blow-out-proof stem and trunnion elements that will not become separated from the valve body even though fluid pressures internally of the valve become extremely high.

This invention is particularly designed to prevent the forces developed by line pressure from being supported solely by the stem and trunnion mechanisms of the valve thereby enhancing resistance of the valve construction to stress corrosion and to other problems associated with excessive stressing of valve parts. This feature is accomplished by the ability of the flexible rotatable valve element to become flattened from its dished concavo-convex configuration thereby causing the sealing surfaces of the valve element to move radially outwardly to enhance the sealing ability of the valve and to allow the seat assembly to provide a supporting function for the rotatable valve element in addition to providing a sealing function. The valve element is therefore supported primarily by the trunnion and stem elements and is supported secondarily by the seat assembly. This feature effectively eliminates overstressing of the trunnion and actuating stem portions of the valve which prevents stress corrosion in the event the valve should be subjected to an environment of hydrogen sulfide.

The valve construction of my invention effectively provides a structure that may be disassembled and repaired without necessitating complete removal of the valve from the line. In the event the valve should be subjected to a corrosive or erosive fluid environment, the valve parts may be provided with a protective lining of any suitable type thereby adapting the butterfly valve construction for virtually any service condition.

Since the butterfly valve element is of relatively thin concavo-convex configuration, it presents minimal obstruction to the flow of fluid and effectively prevents the formation of eddy currents thereby enhancing the flow capability of the valve construction. It is therefore seen that this invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings

Having thus fully described and illustrated my invention, I claim:

1. A high pressure butterfly valve comprising:
    body means having a flow passage defined therein and having opposed stem and trunnion bores;
    an actuating stem extending through said stem bore and having a valve supporting and driving portion thereof extending into said flow passage;
    a trunnion extending through said trunnion bore and having a valve supporting portion thereof extending into said flow passage;
    a lining being disposed within said valve body and having stem and trunnion apertures defined therein, said actuating stem and said trunnion extending through respective ones of said apertures and retaining said cooperating to retain said liner within said valve body;
    an annular, generally rigid seat ring being disposed within said lining and having stem and trunnion apertures defined therein, said actuating stem and said trunnion extending through respective ones of said seat ring apertures and retaining said seat ring within said lining, said seat ring defining an annular seat surface and having a seal groove defined therein intermediate said seat surface;
    resilient seal means being disposed within said seal groove and having a sealing portion thereof extending beyond said seat surface; and
    a valve element being rotatably disposed within said flow passage and having a peripheral sealing surface formed thereon and engaging said seat means and the sealing portion of said resilient seal means in the closed position thereof, said valve element being rotatably supported by said trunnion and being supported in nonrotatable engagement by said actuating stem, said valve element flexing responsive to pressure upstream thereof to increase the circumference of said peripheral sealing surface and enhance the sealing engagement thereof with said valve seat.

2. A high pressure butterfly valve as recited in claim 1:
    said stem and trunnion bores being enlarged at the inner extremities thereof;
    said actuating stem and said trunnion having enlargements at the inner extremities thereof, said enlargements being received by the enlarged portions of said actuating stem and trunnion bores and preventing said actuating stem and trunnion from being blown from said valve body by internal pressure;
    said stem and trunnion openings in said lining and in said seat ring being received by said enlargements of said stem and trunnion; and
    sealing means being disposed about said actuating stem and said trunnion and maintaining sealing engagement with said valve body.

3. A high pressure butterfly valve as recited in claim 1:
    said seat means having an inner sealing surface defining a segment of a sphere; and
    said valve element having an outer peripheral surface being of complimentary configuration to said inner sealing surface.

4. A high pressure butterfly valve as recited in claim 1:
    said inner extremity of said trunnion being of generally spherical configuration;
    said inner extremity of said actuating stem having a drive element formed thereon, said drive element having parallel side surfaces adapted to be disposed in alignment with the axis of said flow passage in the closed position of said valve element and having a generally semi-annular surface;
    said valve element having a genera-ly spherical bearing socket and a drive socket formed therein, said bearing socket and said drive socket corresponding to the respective configuration of said trunnion and said drive element; and
    said inner extremities of said actuating stem and said trunnion being received respectively within said drive socket and said bearing socket and supporting said valve element for rotation within said valve body and cooperating therewith to allow said valve element to be moved in the downstream direction in the closed position thereof for optimum seating contact with said seat ring.

5. A high pressure butterfly valve as recited in claim 4.
    said seat means having an inner sealing surface defining a segment of a sphere;
    said valve element having an outer peripheral surface being of complimentary configuration to said inner sealing surface; and
    annular groove means being formed in said seat means and receiving said resilient sealing means therein for sealing engagement with the peripheral sealing surface of said valve element, said sealing means and said annular groove means being enlarged at the base portion thereof and cooperating to lock said sealing means within said annular groove.

6. A high pressure butterfly valve as recited in claim 1:
    said valve body being defined by upper and lower interfitting body sections;
    means for retaining said body sections in assembly; and
    means establishing a fluid seal between said body sections.

7. A high pressure butterfly valve comprising:
    a valve body being defined by upper and lower interfitting body sections cooperating to define a flow passage and having opposed axially aligned actuating stem and trunnion bores formed therein and defining support shoulders;
    trunnion means extending through said trunnion bore and having a generally spherical valve supporting portion thereof extending into said flow passage;
    actuating stem means extending through said actuating stem bore and having a valve drive projection formed thereon extending into said flow passage;
    a liner sleeve being disposed within said valve body;
    an annular rigid seat ring being disposed within said liner sleeve and having an annular sealing surface formed thereon defining a segment of a sphere;
    an annular groove being defined within said seat means and having an enlarged base portion;
    an annular resilient seaing ring being disposed within said groove said sealing ring having an enlarged base portion cooperating with the base portion of said groove to lock said sealing ring within said groove;

a butterfly valve element being disposed within said flow passage and having a generally spherical bearing socket and a drive socket defined therein, said bearing socket being disposed in rotatable bearing engagement with said trunnion means and said drive socket being received in nonrotatable driving engagement with said valve drive projection of said actuating stem means, said bearing socket and drive socket cooperating respectively with said trunnion and actuating stem to allow pressure responsive downstream movement of said valve element into optimum seating engagement with said seat ring; and said valve element flexing responsive to pressure upstream thereof causing the periphery thereof to enlarge and enhance the sealing engagement thereof with said seat ring.

8. A high pressure butterfly valve as recited in claim 7:

said stem and trunnion bores being enlarged at the inner extremities thereof;

said actuating stem and said trunnion having enlargements at the inner extremities thereof, said enlargements being received by the enlarged portions of said actuating stem and trunnion bores and preventing said actuating stem and trunnion from being blown from said valve body by internal pressure; and sealing means being interposed about said actuating stem and said trunnion and maintaining sealing engagement with said valve body.

9. A high pressure butterfly valve as recited in claim 8:

said seat ring and said liner sleeve having aligned actuating stem and trunnion apertures formed therein, said stem and trunnion apertures receiving said actuating stem and said trunnion and mechanically locking said seat means and said liner sleeve within said valve body.

10. A high pressure butterfly valve as recited in claim 8:

said valve element being of concavo-convex configuration and having the convex surface thereof facing in the upstream direction in the closed position thereof; and said valve element flexing in response to application of fluid pressure thereto thereby causing the peripheral sealing surface thereof to expand and be forcibly urged against the sealing surfaces of said seat means.

11. A high pressure butterfly valve as recited in claim 8:

said valve body being defined by upper and lower interfitting body sections;

means for retaining said body sections in assembly; and means establishing a fluid seal between said body sections.

* * * * *